United States Patent [19]

Jorgensen

[11] Patent Number: 5,933,831
[45] Date of Patent: Aug. 3, 1999

[54] VIEWING ENTITY RELATIONSHIP DIAGRAMS USING HYPERLINKS

[75] Inventor: Eric R. Jorgensen, Greeley, Colo.

[73] Assignee: LSI Logic Corporation, Milpitas, Calif.

[21] Appl. No.: 09/005,056

[22] Filed: Jan. 9, 1998

[51] Int. Cl.$^6$ .................................................. G06F 17/30
[52] U.S. Cl. ........................................ 707/100; 101/102
[58] Field of Search ................................. 707/100, 101, 707/102

[56] References Cited

U.S. PATENT DOCUMENTS

| | | | |
|---|---|---|---|
| 4,479,196 | 10/1984 | Ferrer et al. | 364/900 |
| 5,019,961 | 5/1991 | Addesso et al. | 364/192 |
| 5,146,591 | 9/1992 | Bachman et al. | 395/600 |
| 5,204,947 | 4/1993 | Bernstein et al. | 395/157 |
| 5,241,645 | 8/1993 | Cimral et al. | 395/500 |
| 5,249,300 | 9/1993 | Bachman et al. | 395/800 |
| 5,386,571 | 1/1995 | Kurz | 395/700 |
| 5,392,220 | 2/1995 | Van Den Hamer et al. | 364/488 |
| 5,428,776 | 6/1995 | Rothfield | 395/600 |
| 5,487,135 | 1/1996 | Freeman | 395/75 |
| 5,495,567 | 2/1996 | Iizawa et al. | 395/161 |
| 5,506,984 | 4/1996 | Miller | 395/600 |
| 5,535,325 | 7/1996 | Catell et al. | 395/161 |
| 5,564,119 | 10/1996 | Krawchuk et al. | 395/600 |

FOREIGN PATENT DOCUMENTS

| | | | |
|---|---|---|---|
| 0 348 843 A1 | 7/1991 | European Pat. Off. | 15/40 |
| 89/09970 | 10/1989 | WIPO | 15/40 |

OTHER PUBLICATIONS

Barker, A Logical Model and Schema Integration Architecture for Determining Equivalence in ER–Diagrams, Computing and Information, 1992. Proceedings. ICCI 1992., Fourth International, pp. 320–324, May 1992.

Song et al, Entity Relatioship Modeling, IEEE Potentials, vol. 13, Issue 5, pp. 29–34, Jan. 1995.

What's KnULink?; World Wide Web; Updated on Mar. 24, 1996.

The Simple Story of Aqui; World Wide Web; Updated on Mar. 3, 1996.

*Primary Examiner*—Thomas G. Black
*Assistant Examiner*—Frantz Coby
*Attorney, Agent, or Firm*—David K. Lucente

[57] ABSTRACT

An entity relationship diagram for a relational database is generated from introspection of the relational database to determine which entities should be included within a specific table to be displayed. Tables within the entity relationship diagram are displayed with icons hyperlinked to other portions or displays of the entity relationship diagram. A trigger icon links the displayed table to a display of the trigger information for the displayed table. A primary key icon indicates which column of the displayed table is utilized as the primary key for the displayed table, while a foreign key icon links the displayed table to a display of another table in the entity relationship diagram containing the foreign key. Dashed or dotted lines and dot or diamond terminators associated with the foreign key icon described the relationship between the displayed table and the linked table. A constraint icon links the displayed table to a display of the constraint information for an entity. A menu icon links the displayed table to a pop-up menu of child tables for the display table. Entity relationship diagrams for relational databases may thus be viewed in manageable, easily comprehensible portions, with links between tables directly associating the displayed table with the proper portions of the linked tables. The entity relationship diagram automatically reflects changes to the corresponding relational database.

32 Claims, 6 Drawing Sheets

Figure 1

|  | 204 |  |  |
|---|---|---|---|
|  | Table: LOT |  |  |
| 226 208 | 210 228 206 |  |  |
| NAME | 212 KEYS AND CONSTRAINTS | DATA TYPE |  |
| LOT_ID | P F C |  |  |
| LOT_TYPE | ● 214 |  | . . . |
| FACILITY | 216 ● C 220 218 222 224 |  |  |

(RELATED ART)

VIEWING ENTITY RELATIONSHIP DIAGRAMS USING HYPERLINKS

BACKGROUND OF THE INVENTION

1. Technical Field

The present invention relates generally to relational database tools and in particular to tools for developing and maintaining relational database. Still more particularly, the present invention relates to providing and viewing entity relationship diagrams for development and maintenance of relational databases.

2. Description of the Related Art

Relational databases represent all information as tables, and therefore consist of collections of tables having rows and columns. Each (horizontal) row describes an occurrence of an entity (e.g., a part, a company, etc.), while each (vertical) column describes a characteristic of the entity (e.g., part number, cost, etc.). Each row within a given table is uniquely identified by the values in one or more of the columns.

Figure 4:
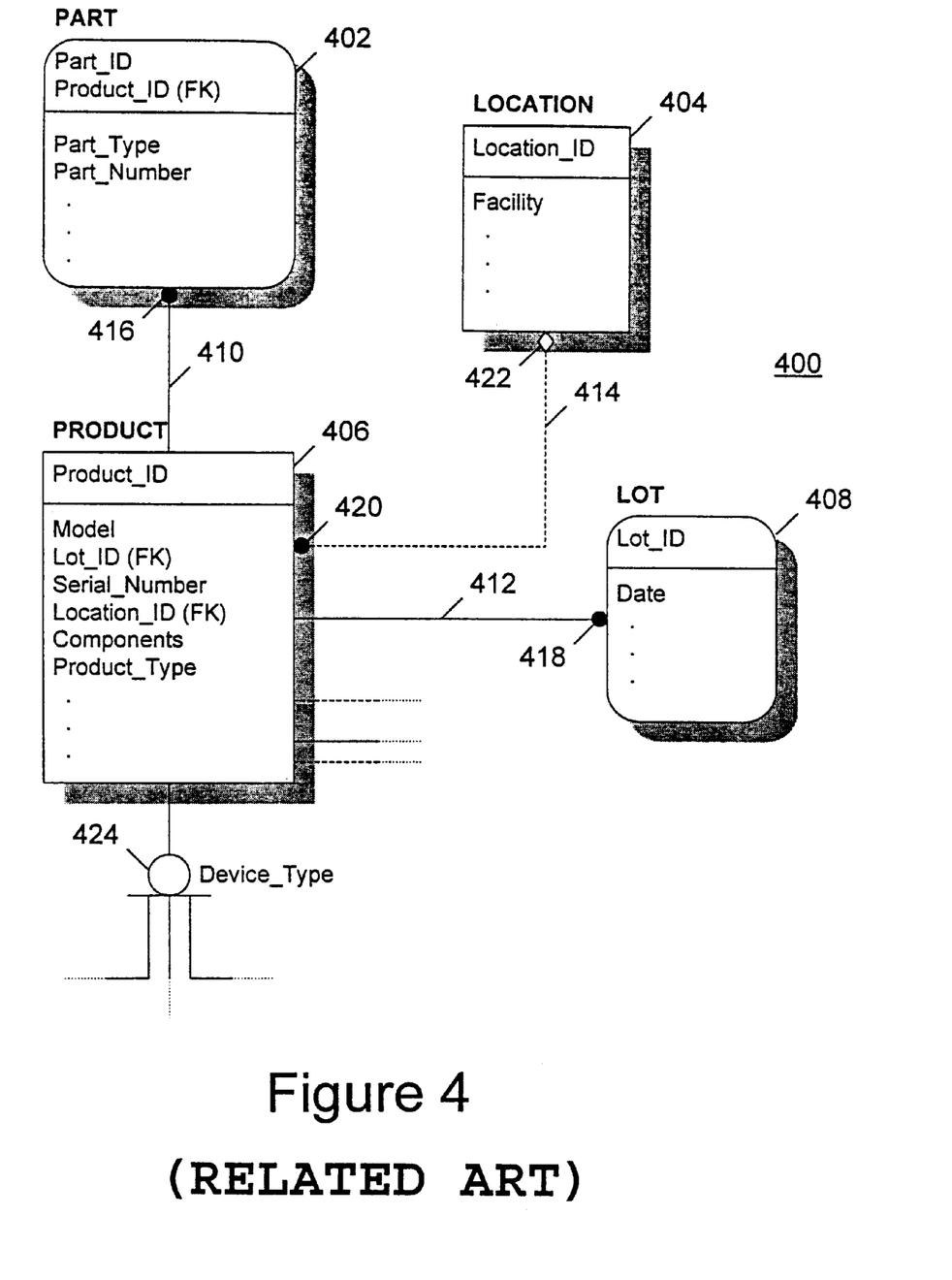
FIG. 4 is an illustration of a portion of a traditional, paper-based entity relationship diagram in accordance with the related art.

Entity relationship diagrams are graphs depicting the links between tables in a relational database. FIG. 4 is an example of a traditional, paper-based entity relationship diagram. Several graphical conventions are employed to convey functional information regarding the entity relationships depicted. Boxes 402 and 408 with rounded corners indicate that the table has a dependent relationship with another table—i.e., is a child table. Boxes 406 and 404 with square corners indicate that the table is independent. Independent tables may be related to other tables—i.e., may be parent tables.

The table headers depicted for table boxes 402, 404, 406, and 408 indicate which columns of the table are used as the primary key for the table. Solid lines 410 and 412 connected two table boxes indicates a mandatory relationship between the two tables, required for referential integrity. Dotted line 414 indicates an optional relationship between the two connected tables. Dot connection terminators 416, 418, and 420 identify the child table in a parent-child table relationship, while diamond connection terminator 422 indicates that the parent table may have a NULL in the identifying column for the child table.

Connection 424 describes a sub-type relationship, which is helpful in modelling tables which may have similar columns but not identical sets of the same columns. For example, a table called VEHICLE might contain all common columns for all vehicles such as miles per gallon, engine size, etc. The VEHICLE table might have subtype tables CAR and TRUCK, where only the CAR table has a column TRUNK_SIZE and only the TRUCK table has a column for BED_SIZE.

Traditional, paper-based entity relationship diagrams may require considerable effort to comprehend, since the lines connecting tables usually simply go to the edges of a table, not necessarily to the portion of the table being referenced. Furthermore, paper-based entity relationship diagrams may be difficult to maintain. For a complex database, the printed entity relationship diagram may easily be several feet long by several feet wide. As the database is changed, which may occur frequently, the corresponding entity relationship diagram must be updated, printed, and duplicated. Each version of the printed entity relationship diagram may potentially need to be distributed to a large number of people, such as the database architects, the database administrators, and software developers.

It would be desirable, therefore, to display an entity relationship diagram in component portions for ease in handling and viewing. It would further be advantageous if the display simplified comprehension of the relationships between tables. It would further be desirable to automatically update the entity relationship diagram from the corresponding database.

SUMMARY OF THE INVENTION

An entity relationship diagram for a relational database is generated from introspection of the relational database to determine which entities should be included within a specific table to be displayed. Tables within the entity relationship diagram are displayed with icons hyperlinked to other portions or displays of the entity relationship diagram. A trigger icon links the displayed table to a display of the trigger information for the displayed table. A primary key icon indicates which column of the displayed table is utilized as the primary key for the displayed table, while a foreign key icon links the displayed table to a display of another table in the entity relationship diagram containing the foreign key. Dashed or dotted lines and dot or diamond terminators associated with the foreign key icon described the relationship between the displayed table and the linked table. A constraint icon links the displayed table to a display of the constraint information for an entity. A menu icon links the displayed table to a pop-up menu of child tables for the display table. Entity relationship diagrams for relational databases may thus be viewed in manageable, easily comprehensible portions, with links between tables directly associating the displayed table with the proper portions of the linked tables. The entity relationship diagram automatically reflects changes to the corresponding relational database.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
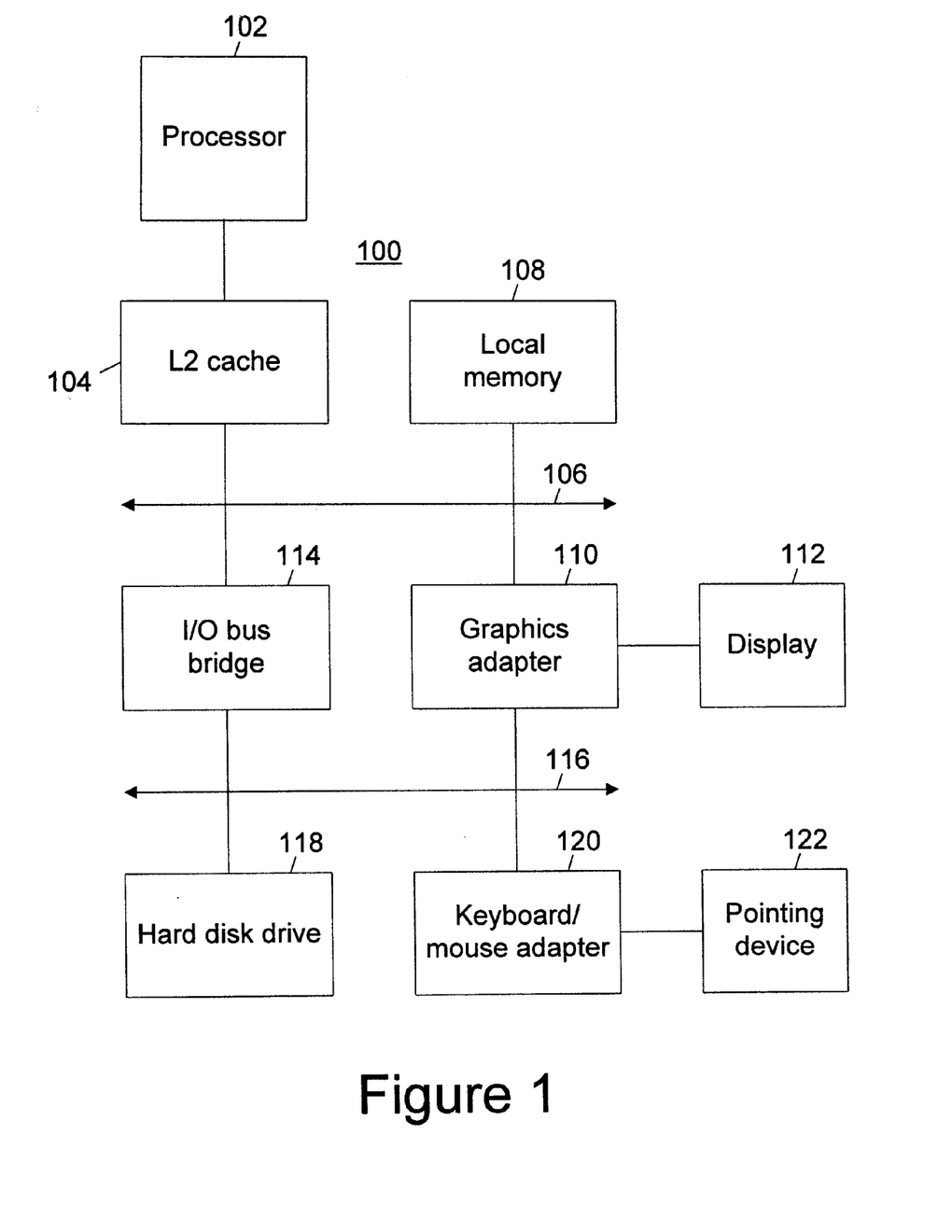
FIG. 1 depicts a data processing system in which a preferred embodiment of the present invention may be implemented is depicted.

With reference now to the figures, and in particular with reference to FIG. 1, a data processing system in which a preferred embodiment of the present invention may be implemented is depicted. Data processing system 100 includes a processor 102 connected to a level two (L2) cache 104, which is connected in turn to a system bus 106.

Memory 108 in the depicted example is also connected to system bus 106, as is memory-mapped graphics adapter 110, which is further connected to display device 112.

Also connected to system bus 106 is an input/output (I/O) bus bridge 114 providing a connection between system bus 106 and I/O 116. I/O bus 116 is connected to hard disk drive 118 and to keyboard/mouse adapter 120. Keyboard/mouse adapter 120 provides an interface for a pointing device 122, which may be a mouse, trackball, touchpad, or the like. I/O bus 116 may also be connected to a local area network (LAN) adapter (not shown), or other peripheral components for data processing system 100. The embodiment depicted is presented merely for the purposes of explaining the invention and is not intended to imply architectural limitations. Those skilled in the art will recognize that many variants of the embodiment depicted may be utilized in connection with the present invention.

Figure 2:
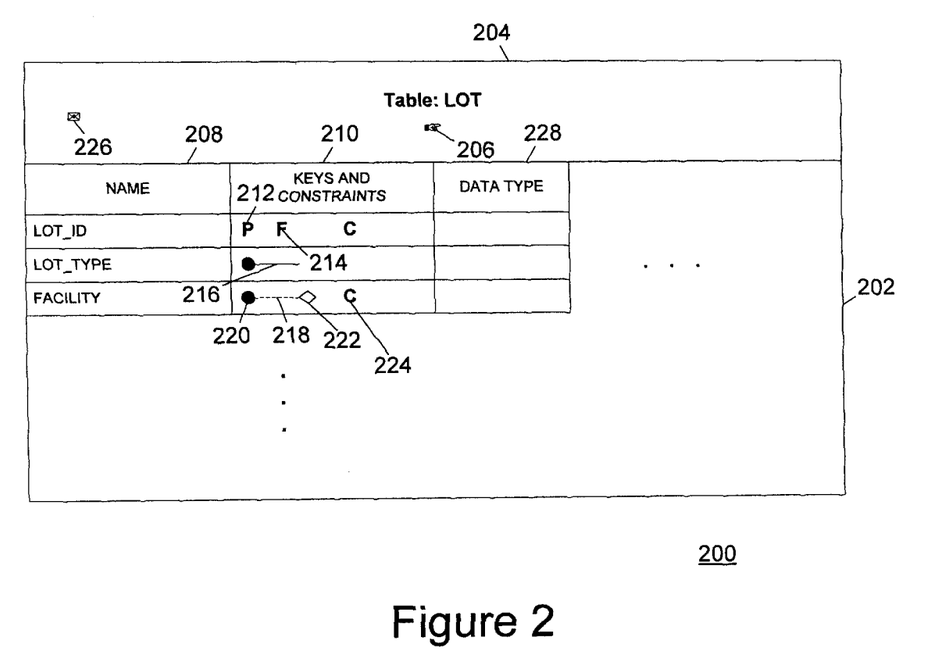
FIG. 2 is a pictorial representation of the display within a user interface for a hyperlinked entity relationship diagram in accordance with a preferred embodiment of the present invention.

Referring to FIG. 2, a pictorial representation of the display within a user interface for a hyperlinked entity relationship diagram in accordance with a preferred embodiment of the present invention is illustrated. Only so much of a hyperlinked display of a relational database table as is necessary to understand the present invention is illustrated. Those skilled in the art will realize that a suitable display may include additional components or variants of the elements shown.

By using hyperlinks, each table within the entity relationship diagram may be individually displayed on the display of a data processing system. Icons indicate the relationship between tables of an entity relationship diagram, and also allow the user to "traverse" or move between tables by clicking on the icons. Large entity relationship diagrams are thus easier to view and comprehend, no matter how complex the corresponding database may be, since only a predetermined portion of the diagram is displayed at a given time. Furthermore, while lines on a traditional, paper-based entity relationship diagram rarely if ever point to the column being referenced, icons within the hyperlinked entity relationship diagram are linked directly to the appropriate information in each table.

Display 200 in the exemplary embodiment includes a table 202 from the entity relationship diagram. Table 200 contains a header 204 in which a trigger icon 206 is displayed if the table includes a trigger. Clicking on trigger icon 206 results in the display of another screen or a box overlying the current screen which shows the details of the trigger.

Table 200 also contains a column 208 in which the name of the entities within the table are listed. A "Keys and Constraints" column 208 contains icons for each entity indicating the relationship of table 202 to other tables within the entity relationship diagram. For example, primary key icon 212 appears in the column which is the primary key for the table being displayed, signifying the table's primary key. Foreign column icon 214 contains an icon signifying a foreign key column of the table. When foreign key icon 214 is clicked, the parent table is displayed with the column of that table which is the foreign key highlighted. A combination of solid lines 216, dashed lines 218, dot terminators 220, and diamond terminators 222 associated with foreign key icon 214 indicate the nature of the relationship between the displayed table and the hyperlinked table in accordance with the conventional significance associated with such graphical features.

Constraint icon 224 indicates the existence of a constraint on the column containing this icon. Clicking on constraint icon 224 results in the display of another screen or a pop-up box where the details of the constraint are shown. Menu icon 226 is displayed when at least one child table exists for the displayed table 202. Clicking on menu icon 226 causes display of a pop-up menu containing all child tables which depend from displayed table 202. Table 202 may include additional columns, such as column 226 indicating the data type for each entity in the relational database represented by the entity relationship diagram.

Although the exemplary embodiment is described and depicted as displaying only one table from an entity relationship diagram at a time, those skilled in the art will readily recognize that this is not a constraint to the present invention. In an alternative embodiment, multiple tables may be displayed in a scrollable window displaying a portion of the total entity relationship diagram, with the hyperlinked icons changing the focus of the active display window among different tables within the entity relationship diagram.

Figure 3A:
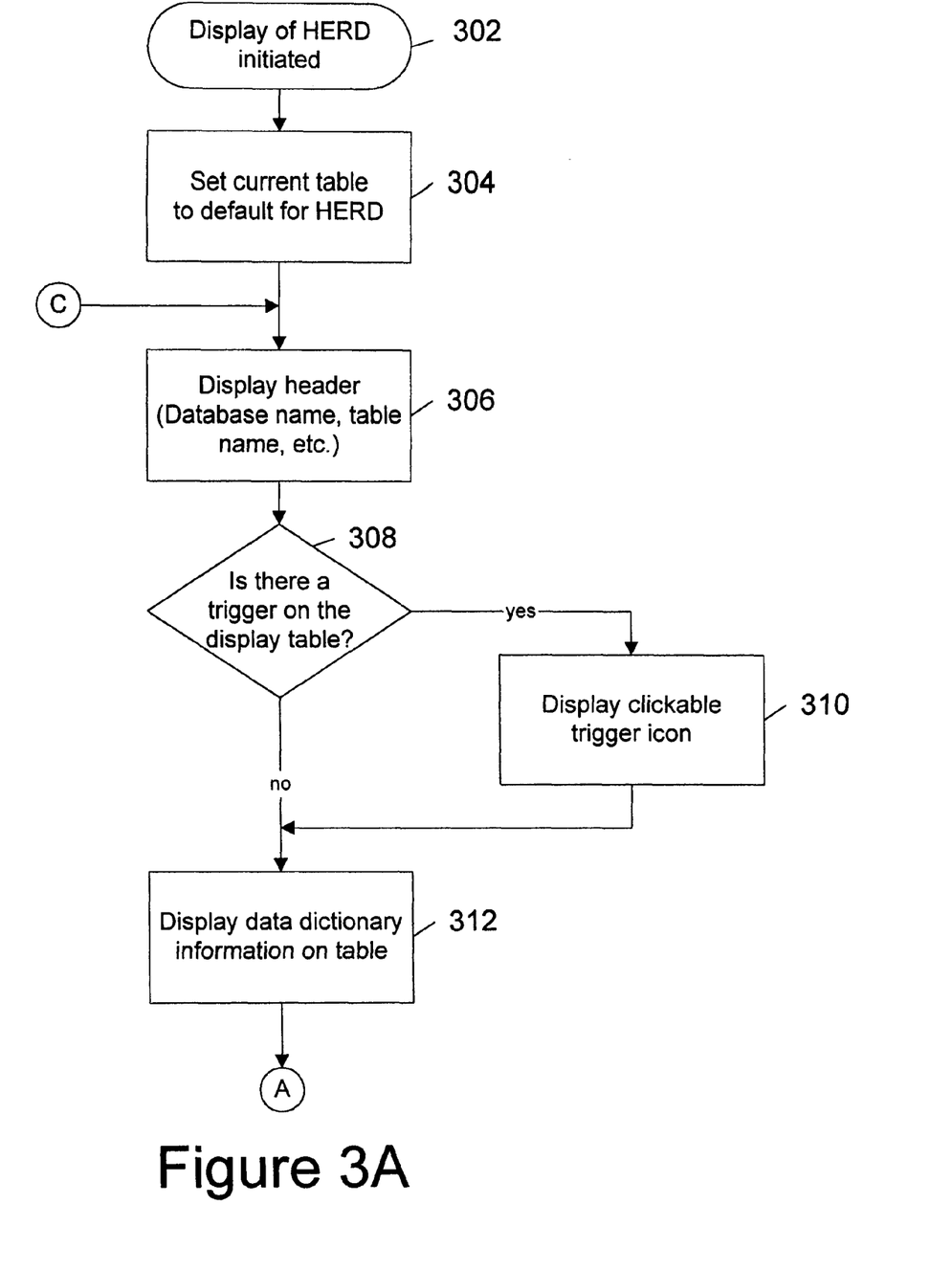
FIGS. 3A–3C depicts a high level flowchart for a process of employing a hyperlinked entity relationship diagram in accordance with a preferred embodiment of the present invention.
Figure 3B:
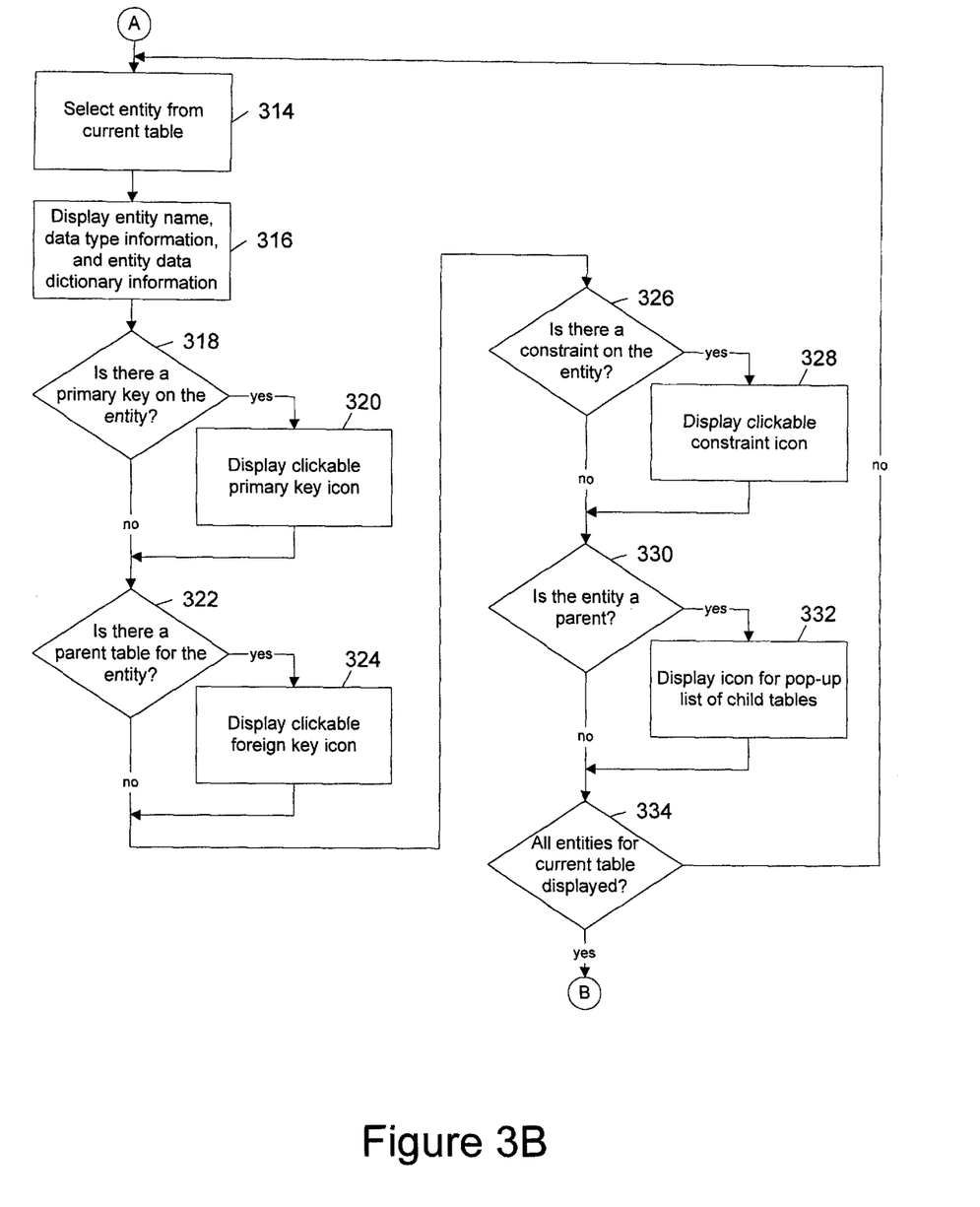
Figure 3C:
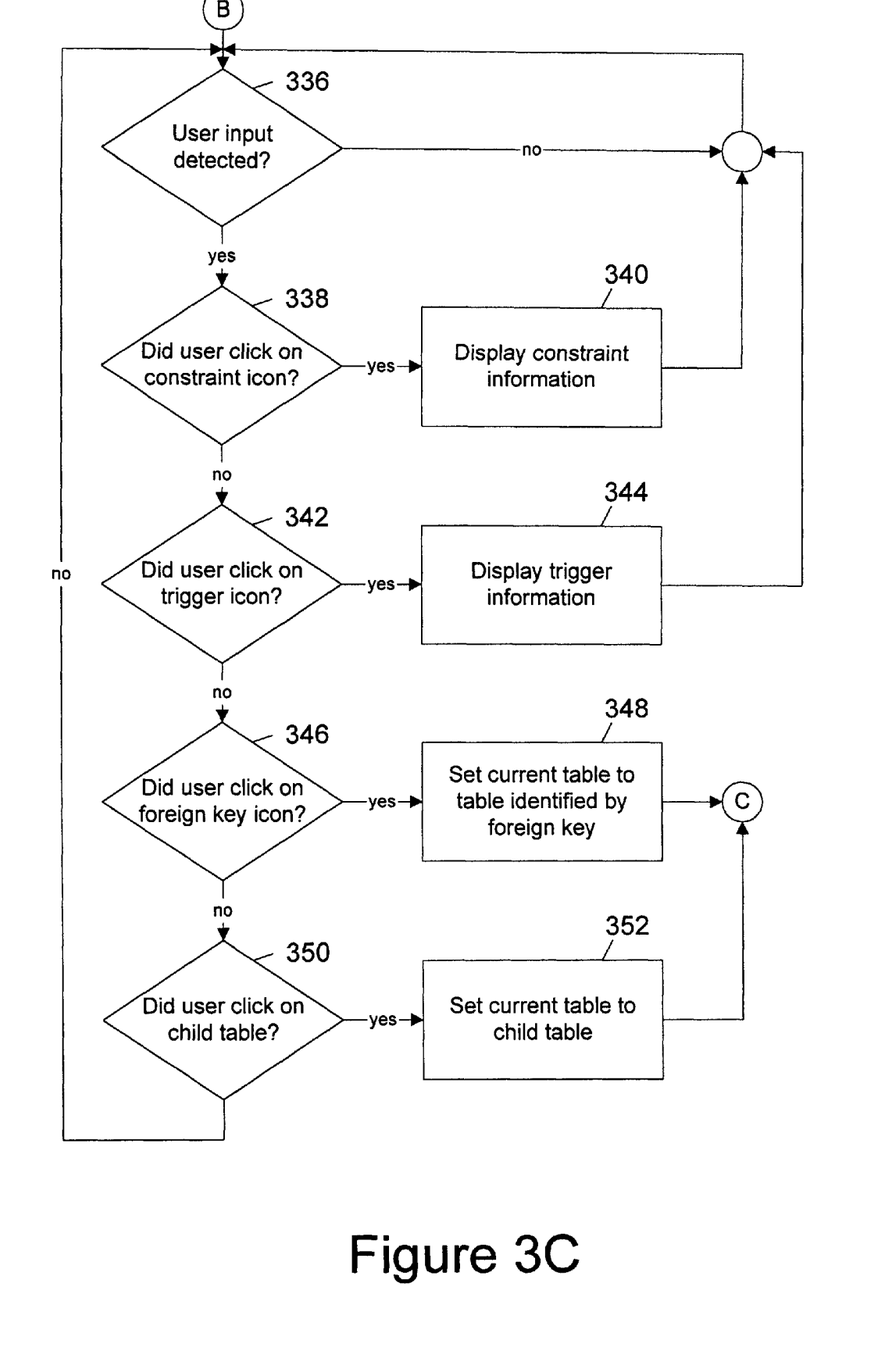

With reference now to FIGS. 3A–3C, a high level flowchart for a process of employing a hyperlinked entity relationship diagram in accordance with a preferred embodiment of the present invention is depicted. The process may be started by a user employing a pointing device connected to a data processing system to actuate a program for displaying hyperlinked entity relationship diagrams and selecting a relational database stored on a hard disk drive connected to the data processing system for viewing, in accordance with methods known in the art.

The process begins at step 302, which depicts a user initiating display of a hyperlinked entity relationship diagram (HERD) for a relational database in accordance with the present invention. The process then passes to step 304, which illustrates setting the current table to a default table. The default table may be selected by the user for initial display when the hyperlinked entity relationship diagram is brought up for viewing, or may be the last table viewed when the user last viewed the hyperlinked entity relationship diagram. The process next passes to step 306, which depicts displaying the header information for the display table, including the database name, the table name, and any other relevant information. This header information may be ascertained by interrogating or "introspecting" the relational database corresponding to the entity relationship diagram being displayed.

The process passes next to step 308, which illustrates a determination of whether there is a trigger on the table currently selected for display, which may be ascertained from the relational database itself. If so, the process passes to step 310, which depicts displaying a clickable trigger icon in association with the current table, and then to step 312. If there is no trigger on the current table, however, the process proceeds instead directly to step 312, which illustrates displaying the data dictionary information for the current table. The data dictionary information is stored in the database and describes the business processes from which each column or table in the entity relationship diagram comes.

The process passes next to step 314, which depicts selecting an entity from the current table for display and then to step 316, which illustrates displaying the entity name, data type information, entity data dictionary information, and other relevant information in the appropriate columns of the displayed table. This information may be ascertained from the relational database.

The process next passes to step 318, which depicts a determination of whether there exists a primary key on the currently selected entity from the current table. The existence of a primary key for the current entity may be determined from the relational database. If a primary key exists, the process proceeds to step 320, which illustrates displaying a clickable primary key icon in association with the currently selected entity within the displayed table, and then to step 322.

If there is no primary key on the currently selected entity, the process proceeds instead directly to step 322, which depicts a determination of whether a parent table exists for the currently selected entity. The existence of a parent table for the currently selected entity may be established by the relational database. If a parent table exists for the currently selected entity, the process proceeds to step 324, which illustrates displaying a clickable foreign key icon for the entity in the table, and then to step 326.

If there is no parent table for the entity currently selected, the process proceeds directly to step 326, which depicts a determination of whether there is a constraint on the current entity. The presence of constraints on the current entity may be determined by interrogating the relational database. If a constraint exist, the process proceeds to step 328, which illustrates displaying a clickable constraint icon for the current entity within the table, and then to step 330.

If no constraint is found for the current entity, the process proceeds instead directly to step 330, which depicts a determination of whether the entity is a parent—i.e., whether there exists one or more child tables for the currently selected entity. This determination may be made from the relational database. If at least one child exists, the process proceeds to step 332, which illustrates displaying a list of child tables for the currently selected entity with each name in the list hyperlinked to the respective child table, and then to step 334.

If no child tables exist for the current entity, the process proceeds directly to step 324, which depicts a determination of whether all entities for the currently selected table have been displayed. If not, the process returns to step 314 for selection of another entity and repetition of steps 316–332 for the newly-selected entity. If all entities are displayed, however, the process proceeds instead to step 336, which illustrates a determination of whether user input is detected. If not, the process returns to step 336 to continue polling for user input.

Once user input is detected, the process proceeds to step 338, which depicts a determination of whether the user clicked on a constraint icon. If so, the process proceeds to step 340, which illustrates displaying the constraint information for the entity associated with the icon actuated by the user, and then returns to step 336 to await further user input. If not, however, the process proceeds instead to step 342, which depicts a determination of whether the user clicked on a trigger icon for the currently displayed table. If so, the process proceeds to step 344, which illustrates displaying the trigger information for the table. Both the constraint information and the trigger information described above may be displayed in a "pop-up" window of the type known in the art and associated with the respective icons.

If the user did not click on the trigger icon, or if there exists no trigger for the currently displayed table, the process proceeds instead to step 346, which depicts a determination of whether the user clicked on a foreign key icon. If so, the process proceeds to step 348, which illustrates setting the current table to the table identified by the foreign key associated with the actuated foreign key icon (that is, the entity's parent table). If not, however, the process proceeds instead to step 350, which depicts a determination of whether the user clicked on the name of a child table listed in association with an entity. If so, the process proceeds to step 352, which illustrates setting the current table to the selected child table.

From either of steps 348 or 352, the process returns to step 306 to repeat the process described above for the newly selected table. If a child table was not selected by the user input, however, the process returns instead to step 336 to await further user input. Although not depicted, the process may also include a determination of whether the user input was intended to terminate display of the hyperlinked entity relationship diagram for the selected relational database, to initiate viewing of a hyperlinked entity relationship diagram for another relational database accessible to the user, etc. Alternatively, the process may simply continue until interrupted or killed by another process.

The present invention allows entity relationship diagrams to be viewed in manageable, easily comprehensible portions, with links between tables directly associated with the proper portions of the respective tables. Printing, duplication, distribution, and other handling problems are virtually eliminated, since the software for generating and displaying hyperlinked entity relationship diagrams may be readily distributed with conventional relational database tools. Because the relational database is interrogated on a real-time basis to ascertain the information to be displayed, the hyperlinked entity relationship database of the present invention automatically reflects updates or changes to the relational database.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The description of the preferred embodiment of the present invention has been presented for purposes of illustration and description, but is not intended to be exhaustive or limit the invention in the form disclosed. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method of generating a hyperlinked entity relationship diagram, comprising:

selecting a table from the entity relationship diagram for display;

introspecting a relational database corresponding to the entity relationship diagram to identify entities included within the table to be displayed, attributes of the table to be displayed, and attributes of entities within the table to be displayed;

displaying the table with a row for each entity identified within the table and a column for each characteristic of the corresponding entity; and displaying at least one icon within the displayed table hyperlinked to a display of a different aspect of the entity relationship diagram.

2. The method of claim 1, wherein the step of selecting a table from the entity relationship diagram for display further comprises:

selecting a child table linked to a menu entry selected by a user.

3. The method of claim 1, wherein the step of selecting a table from the entity relationship diagram for display further comprises:

selecting a parent table linked to a foreign key icon selected by a user.

4. The method of claim 1, wherein the step of introspecting a relational database corresponding to the entity relationship diagram to identify entities included within the table to be displayed, attributes of the table to be displayed, and attributes of entities within the table to be displayed further comprises:

determining whether a trigger exists for the table to be displayed.

5. The method of claim 4, wherein the step of displaying at least one icon within the displayed table hyperlinked to a display of a different aspect of the entity relationship diagram further comprises:

responsive to determining that a trigger exists for the table to be displayed, displaying a trigger icon hyperlinked to details of the trigger, wherein clicking on the trigger icon results in display of the details of the trigger.

6. The method of claim 1, wherein the step of introspecting a relational database corresponding to the entity relationship diagram to identify entities included within the table to be displayed, attributes of the table to be displayed, and attributes of entities within the table to be displayed further comprises:

for each entity within the table to be displayed, determining whether a parent table exists for the entity.

7. The method of claim 6, wherein the step of displaying at least one icon within the displayed table hyperlinked to a display of a different aspect of the entity relationship diagram further comprises:

for each entity determined to have a parent table, displaying a foreign key icon hyperlinked to the parent table, wherein clicking on the foreign key icon results in display of the parent table.

8. The method of claim 7, wherein the step of displaying a foreign key icon hyperlinked to the parent table further comprises:

linking the foreign key icon to the associated entity within the parent table corresponding to the table to be displayed, wherein clicking on the foreign key icon results in display of the parent table with the associated entity within the parent table highlighted.

9. The method of claim 7, wherein the step of displaying a foreign key icon hyperlinked to the parent table further comprises:

displaying, in association with the foreign key icon, a graphical indication of a relationship between the entity in the table to be displayed and the parent table.

10. The method of claim 1, wherein the step of introspecting a relational database corresponding to the entity relationship diagram to identify entities included within the table to be displayed, attributes of the table to be displayed, and attributes of entities within the table to be displayed further comprises:

for each entity within the table to be displayed, determining whether a constraint exists for the entity.

11. The method of claim 10, wherein the step of displaying at least one icon within the displayed table hyperlinked to a display of a different aspect of the entity relationship diagram further comprises:

for each entity determined to have a constraint, displaying a constraint icon hyperlinked to details of the constraint, wherein clicking on the constraint icon results in display of the constraint details.

12. The method of claim 1, wherein the step of introspecting a relational database corresponding to the entity relationship diagram to identify entities included within the table to be displayed, attributes of the table to be displayed, and attributes of entities within the table to be displayed further comprises:

for each entity within the table to be displayed, determining whether a child table exists for the entity.

13. The method of claim 12, wherein the step of displaying at least one icon within the displayed table hyperlinked to a display of a different aspect of the entity relationship diagram further comprises:

responsive to determining that at least one entity within the table to be displayed has a child table, displaying a menu icon hyperlinked to a display of a menu list including an identification of each entity within the table to be displayed having a child table.

14. The method of claim 13, wherein the step of displaying a menu icon hyperlinked to a display of a menu list including an identification of each entity within the table to be displayed having a child table further comprises:

linking each entry within the menu list to a child table identified by the entry, wherein clicking on the entry in the menu list results in display of the child table identified by the entry.

15. An apparatus for generating a hyperlinked entity relationship diagram, comprising:

storage media containing a relational database;

a processor connected to the storage media, the processor:
selecting a table from the relational database for display;
introspecting the relational database to identify entities included within the selected table, attributes of the selected table, and attributes of entities within the selected table; and a display connected to the processor, the display displaying the table with a row for each entity identified within the table, a column for each characteristic of the corresponding entity, and at least one icon hyperlinked to a display of a different aspect of the entity relationship diagram.

16. The apparatus of claim 14, wherein the processor introspects the relational database to determine whether a trigger exists for the selected table, which entity within the selected table is a primary key for the selected table, whether a parent table exists for the selected table, whether an entity within the selected table has a constraint, and whether an entity within the selected table has a parent table.

17. The apparatus of claim 16, wherein the display displays:

a trigger icon if the selected table has a trigger, wherein the trigger icon is linked to details of the trigger;

a primary key icon within the row of an entity within the selected table which is the primary key for the selected table;

a foreign key icon within the row of an entity within the selected table which has a parent table, wherein the foreign key icon is linked to a corresponding entity in the parent table;

a constraint icon within the row of an entity within the selected table having a constraint, wherein the constraint icon is linked to details of the constraint; and a menu icon if at least one entity within the selected table is a parent table, wherein the menu icon is linked to a list of child table identifiers for entities within the selected table having a corresponding child table.

18. The apparatus of claim 17, further comprising:

a pointing device connected to the processor and controlling display of a pointer on the display, wherein a user may actuate the pointing device to select a component of the display, wherein:

selection of the trigger icon results in display of the trigger details;

selection of the foreign key icon within the row of an entity within the selected table results in display of the parent table with an entity corresponding to the selected table highlighted;

selection of the constraint icon within the row of an entity within the selected table results in display of the constraint details; and selection of the menu icon results in display of the list of child table identifiers for entities within the selected table, each child table identifier within the list linked to the corresponding child table for an entity within the selected table, wherein selection of a child table identifier from the list results in a display of the corresponding child table.

19. A computer program product for use with a data processing system, comprising:

a computer usable medium;

first instructions in said computer usable medium for selecting a table from the entity relationship diagram for display;

second instructions in said computer usable medium for introspecting a relational database corresponding to the entity relationship diagram to identify entities included within the table to be displayed, attributes of the table to be displayed, and attributes of entities within the table to be displayed; and third instructions in said computer usable medium for displaying the table with a row for each entity identified within the table, a column for each characteristic of the corresponding entity, and at least one icon hyperlinked to a display of a different aspect of the entity relationship diagram.

20. The computer program product of claim 19, wherein the first instructions further comprise:

instructions for selecting a child table linked to a menu entry selected by a user.

21. The computer program product of claim 19, wherein the first instructions further comprise:

instructions for selecting a parent table linked to a foreign key icon selected by a user.

22. The computer program product of claim 19, wherein the second instructions further comprise:

instructions for determining whether a trigger exists for the table to be displayed.

23. The computer program product of claim 19, wherein the third instructions further comprise:

instructions, responsive to determining that a trigger exists for the table to be displayed, for displaying a trigger icon hyperlinked to details of the trigger, wherein clicking on the trigger icon results in display of the details of the trigger.

24. The computer program product of claim 19, wherein the second instructions further comprise:

instructions for each entity within the table to be displayed, determining whether a parent table exists for the entity.

25. The computer program product of claim 24, wherein the third instructions further comprise:

instructions for displaying, for each entity determined to have a parent table, a foreign key icon hyperlinked to the parent table, wherein clicking on the foreign key icon results in display of the parent table.

26. The computer program product of claim 25, wherein the third instructions further comprise:

instructions for linking the foreign key icon to the associated entity within the parent table corresponding to the table to be displayed, wherein clicking on the foreign key icon results in display of the parent table with the associated entity within the parent table highlighted.

27. The computer program product of claim 25, wherein the third instructions further comprise:

instructions for displaying, in association with the foreign key icon, a graphical indication of a relationship between the entity in the table to be displayed and the parent table.

28. The computer program product of claim 19, wherein the second instructions further comprise:

instructions for determining, for each entity within the table to be displayed, whether a constraint exists for the entity.

29. The computer program product of claim 28, wherein the third instructions further comprise:

instructions for displaying, for each entity determined to have a constraint, a constraint icon hyperlinked to details of the constraint, wherein clicking on the constraint icon results in display of the constraint details.

30. The computer program product of claim 19, wherein the second instructions further comprise:

instructions for determining, for each entity within the table to be displayed, whether a child table exists for the entity.

31. The computer program product of claim 30, wherein the third instructions further comprise:

instructions, responsive to determining that at least one entity within the table to be displayed has a child table, for displaying a menu icon hyperlinked to a display of a menu list including an identification of each entity within the table to be displayed having a child table.

32. The computer program product of claim 31, wherein the third instructions further comprise:

instructions for linking each entry within the menu list to a child table identified by the entry, wherein clicking on the entry in the menu list results in display of the child table identified by the entry.

* * * * *